(12) United States Patent
Xue et al.

(10) Patent No.: US 10,399,180 B2
(45) Date of Patent: Sep. 3, 2019

(54) METHOD AND DEVICE FOR STRENGTHENING LASER SHOCK OF HIDDEN SURFACE

(71) Applicants: Wenzhou University, Zhejiang (CN); Jiangsu University, Jiangsu (CN); Southeast University, Nanjing (CN)

(72) Inventors: Wei Xue, Zhejiang (CN); Jinzhong Lu, Jiangsu (CN); Kaiyu Luo, Jiangsu (CN); Yongkang Zhang, Nanjing (CN); Fengze Dai, Jiangsu (CN)

(73) Assignees: Wenzhou University, Zhejiang (CN); Jiangsu University, Jiangsu (CN); Southeast University, Nanjing (CN)

( * ) Notice: Subject to any disclaimer, the term of this patent is extended or adjusted under 35 U.S.C. 154(b) by 390 days.

(21) Appl. No.: 14/898,952

(22) PCT Filed: Oct. 23, 2013

(86) PCT No.: PCT/CN2013/085750
§ 371 (c)(1),
(2) Date: Dec. 16, 2015

(87) PCT Pub. No.: WO2014/201788
PCT Pub. Date: Dec. 24, 2014

(65) Prior Publication Data
US 2016/0318123 A1    Nov. 3, 2016

(30) Foreign Application Priority Data
Jun. 20, 2013 (CN) .......................... 2013 1 0245984

(51) Int. Cl.
*B23K 26/082* (2014.01)
*B23K 26/03* (2006.01)
(Continued)

(52) U.S. Cl.
CPC ............ *B23K 26/082* (2015.10); *B23K 26/03* (2013.01); *B23K 26/0622* (2015.10); *B23K 26/356* (2015.10); *C21D 10/005* (2013.01)

(58) Field of Classification Search
USPC .............. 219/121.6, 121.63, 121.68, 121.74, 219/121.85
See application file for complete search history.

(56) References Cited

U.S. PATENT DOCUMENTS 4,638,143 A * 1/1987 Akeel ................ B23K 26/0884
219/121.63
5,200,597 A * 4/1993 Eastman ............ G06K 7/10584
235/455
(Continued)

FOREIGN PATENT DOCUMENTS

| CN | 101024862 A | 8/2007 |
| CN | 101942546 A | 1/2011 |
| CN | 103290178 A | 9/2013 |

OTHER PUBLICATIONS

State Intellectual Property Office of the P. R. China, International Search Report issued on PCT application No. CN2013/085750, dated Mar. 27, 2014, 3 pages.

*Primary Examiner* — Ibrahime A Abraham
*Assistant Examiner* — Gyounghyun Bae
(74) *Attorney, Agent, or Firm* — Greenberg Traurig, LLP

(57) ABSTRACT

A method and device for strengthening the laser shock of a hidden surface includes establishing a continuous laser shock strengthening track and process after acquiring the information about the whole hidden surface. A control system adjusts the movement and rotation of a total reflection mirror which is arranged in a workpiece according to the signal from signal collecting cards for making a reflected laser beam act on a region to be machined of the hidden surface at an appropriate incidence angle. The method can (Continued)

realize the surface strengthening treatment of the hidden surface of the workpiece, significantly improve the mechanical performance of the workpiece and increase the fatigue life thereof, which is applicable to the surface strengthening of the workpiece with the hidden surface.

1 Claim, 1 Drawing Sheet

(51) Int. Cl.
  *B23K 26/122* (2014.01)
  *C21D 10/00* (2006.01)
  *B23K 26/356* (2014.01)
  *B23K 26/0622* (2014.01)

(56) References Cited

U.S. PATENT DOCUMENTS

| | | | | |
|---|---|---|---|---|
| 5,492,447 A | * | 2/1996 | Mannava | C21D 10/005 415/200 |
| 5,522,706 A | * | 6/1996 | Mannava | C21D 10/005 416/215 |
| 5,571,575 A | * | 11/1996 | Takayanagi | B23K 26/18 427/178 |
| 5,846,054 A | * | 12/1998 | Mannava | F01D 5/286 416/219 R |
| 5,911,890 A | * | 6/1999 | Dulaney | B23K 26/06 148/525 |
| 6,002,102 A | * | 12/1999 | Dulaney | B23K 26/06 219/121.85 |
| 6,049,058 A | * | 4/2000 | Dulaney | C21D 10/005 219/121.6 |
| 6,163,012 A | * | 12/2000 | Kimura | B23K 26/106 219/121.63 |
| 6,469,275 B2 | * | 10/2002 | Dulaney | B23K 26/06 219/121.85 |
| 6,566,629 B1 | * | 5/2003 | Dulaney | B23K 26/0069 219/121.74 |
| 6,674,585 B1 | * | 1/2004 | Calvet | G02B 7/00 359/822 |
| 6,807,218 B1 | * | 10/2004 | Greenwood | G02B 6/262 257/E31.108 |
| 6,859,470 B2 | * | 2/2005 | Fu | G02B 6/4201 372/34 |
| 6,870,627 B2 | * | 3/2005 | Elkind | G01N 21/553 204/400 |
| 7,321,105 B2 | * | 1/2008 | Clauer | B23K 26/0069 219/121.78 |
| 8,680,430 B2 | * | 3/2014 | Unrath | B23K 26/0823 219/121.72 |
| 9,533,371 B2 | * | 1/2017 | El-Wardany | B23K 26/0069 |
| 2002/0126717 A1 | * | 9/2002 | Nasu | G02B 6/4206 372/32 |
| 2004/0226637 A1 | * | 11/2004 | Dulaney | B23K 26/06 219/121.6 |
| 2005/0171703 A1 | * | 8/2005 | Goldfine | G01N 27/9013 702/30 |
| 2006/0006158 A1 | * | 1/2006 | Lawrence | B23K 26/03 219/121.82 |
| 2007/0108169 A1 | * | 5/2007 | Shimada | C21D 10/005 219/121.85 |
| 2010/0116796 A1 | * | 5/2010 | Jancso | B23K 26/0884 219/121.67 |
| 2011/0109891 A1 | * | 5/2011 | Farnsworth | G03F 7/70825 355/67 |
| 2011/0132886 A1 | * | 6/2011 | Tenaglia | B23K 26/18 219/121.85 |

\* cited by examiner

METHOD AND DEVICE FOR STRENGTHENING LASER SHOCK OF HIDDEN SURFACE

CROSS REFERENCE TO RELATED APPLICATION

The present application is a 371 U.S. National Stage of International Application No. PCT/CN2013/085750, filed Oct. 23, 2013, which claims the benefit of the earlier filing date of Chinese Patent Application No. 201310245984.5 filed on Jun. 20, 2013, which are each incorporated herein by reference in their entirety.

FIELD OF THE INVENTION

The present invention relates to the laser processing field, in particular to a laser shock peening method for a hidden surface and a device that implements the method, which are applicable to surface strengthening for a workpiece with the hidden surface.

BACKGROUND OF THE INVENTION

Laser shock peening (LSP), known as laser shot blasting, is a new material surface strengthening technique. LSP utilizes the mechanical effect of shock wave induced by strong laser to process the material, and features with high pressure, high energy, ultra-fast and ultra-high strain rate, etc. The residual compressive stress layer formed by LSP can effectively eliminate stress concentration in the material and inhibit occurrence and development of the crack, and thereby significantly improve the fatigue life and ability of corrosion resistance and wear resistance of metal parts.

At present, in China, LSP is mainly used for processing external surfaces of workpieces, such as blades and gears, but there are few reports on application of laser shock peening on bearings and parts that utilize a hidden surface as the working face. In the Chinese Patent Application No. 200610096476.5 filed by Yongkang ZHANG et al, titled as "Technical hole wall intensifying method based on laser impaction wave and apparatus", a reflected shock wave processing method for hole walls of the workpiece is disclosed. Subsequently, in the Chinese Patent Application No. 201010510712.X filed by Yinfang JIANG et al, titled as "Method and device for laser shock processing of fastening holes", a similar processing method for wall holes is disclosed. However, in a case that the hidden surface of the workpiece is a curved surface or the aperture size is large, both of the above-methods are not applicable. The reasons are: if the hidden surface of the workpiece is a curved surface, it will be difficult to produce an appropriate reflecting cone to enable the reflected shock wave act on the hidden surface uniformly; if the aperture size is very large, the reflected shock wave will tend to diffuse, and thereby the effect of laser shock peening on the hole wall will be compromised. The key point in the processing of a hidden surface is to introduce the laser beam into the workpiece and ensure an appropriate incident angle acts on the region to be processed of the hidden surface.

CONTENTS OF THE INVENTION

The object of the present invention is to provide a laser shock peening method and device for a hidden surface, in order to strengthen the properties of the hidden surface where the hidden surface is a curved one or the aperture size is large.

To solve the above-technical problem, the present invention employs the following technical scheme: A laser shock peening method for a hidden surface, characterized in: utilizing method similar to processing in segments; controlling the shifting and rotation of a total reflecting mirror in a workpiece by means of a control system according to the signal adjusting setting of a signal collecting card, so that a reflected laser beam acts on the region to be processed on the hidden surface at an appropriate incident angle, i.e., an included angle between the reflected laser beam and the normal line of the region to be processed on the hidden surface, to carry out laser shock peening for the hidden surface, wherein, the incident angle is within a range of 0°~30°.

The present invention has the following beneficial effects:

(1) As the laser shock peening technique is applied on the processing hidden surfaces of the workpiece, the scope of application of the leading-edge laser shock wave technique is expanded;

(2) Approximate segmental processing is realized by means of rotation and shifting of the total reflecting mirror, a continuous laser shock peening trace and process can be established according to the obtained information of the entire hidden surface, and laser shock peening can be carried out for the hidden surface. Such an approach is applicable to workpieces with different hidden surfaces;

(3) The range of incident angle of the reflected laser beam in the present invention is 0°~30°, which is favorable for ensuring the uniformity of laser shock peening and improving processing quality.

DESCRIPTION OF THE DRAWINGS

To explain the embodiments of the present invention or the technical scheme in the prior art more clearly, hereunder the accompanying drawings required for description of the embodiments or the prior art will be introduced briefly.

In the figure: 1—laser, 2—laser control unit, 3—incident laser beam, 4—workpiece, 5—water tank, 6—absorbing layer, 7—fixture, 8—working platform, 9—signal collecting card I, 10—signal collecting card II, 11—total reflecting mirror, 12—feeder unit, 13—control system.

Figure 2:
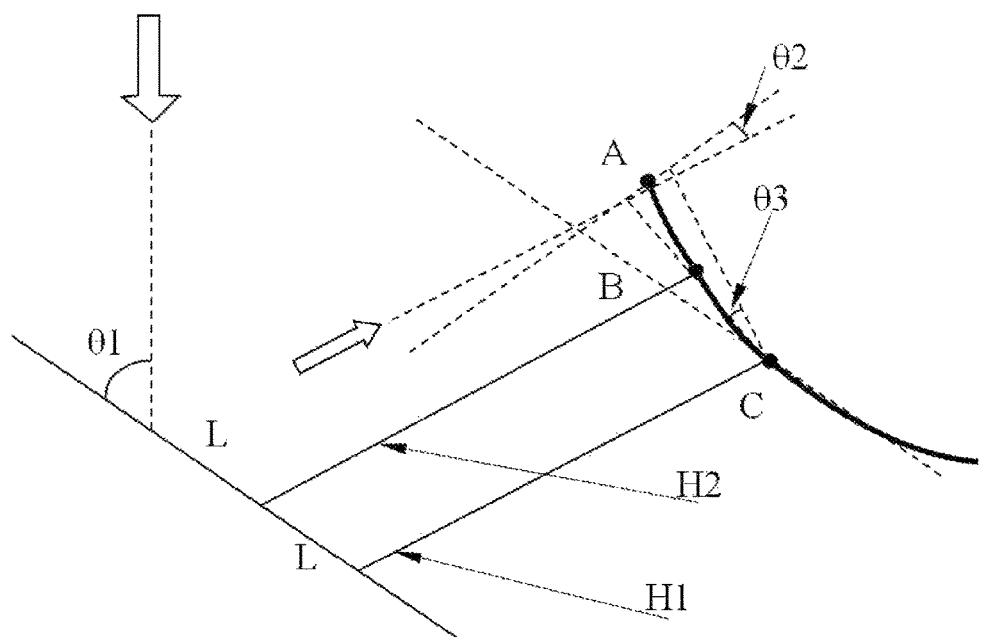

FIG. 2 is a schematic diagram of segmental processing.

In the figure: $\theta 1$ is the included angle between the incident laser beam and the total reflecting mirror, $\theta 2$ is the theoretical angle of rotation of the total reflecting mirror required after the segment AB is processed, and $\theta 3$ is the actual angle of rotation of the total reflecting mirror obtained with an approximation method after the segment AB is processed.

DETAILED DESCRIPTION OF THE EMBODIMENTS

Hereunder the technical scheme of the present invention will be further detailed with reference to the accompanying drawings.

A device that implements the laser shock peening method for a hidden surface, comprising: a laser (1), a laser control unit (2), a water tank (5), an absorbing layer (6), a fixture (7), a working platform (8), a signal collecting card I (9), a signal collecting card II (10), a total reflecting mirror (11), a feeder unit (12), and a control mechanism (13); wherein, the laser (1) is disposed at the topmost position, the laser control unit (2) is connected to the laser (1), the water tank (5) is disposed under the laser, the total reflecting mirror (11), signal collecting card I (9), and signal collecting card II (10) are mounted on the fixture (7), the fixture (7) is connected to the working platform (8) through the feeder unit (12), the control system (13) is disposed outside of the water tank (5), and are connected with the signal collecting card I (9), signal collecting card II (10), and working platform (8) through signal cables respectively, characterized in: the signal collecting card I (9) and the signal collecting card II (10) are in the plane of the total reflecting mirror (11), the connecting line between the signal collecting card I (9) and the signal collecting card II (10) is coplanar with the incident laser beam, and the distance between the signal collecting card I (9) and the signal collecting card II (10) is equal to the distance between the incidence point of the incident laser beam on the total reflecting mirror (11) and the signal collecting card II (10); the feeder unit (12) enables the fixture (7) to move in six degrees of freedom.

The control mechanism (13) can receive signals from the signal collecting card I (9) and the signal collecting card II (10), and control the movement of the working platform (8), signal collecting card I (9), and signal collecting card II (10) simultaneously. The technical innovation in the present invention lies in: the contour line of the hidden surface is approximately divided into many small straight line segments, in which two small straight line segments connected with each other are at an angle to each other. The laser shock peening process proceeds along these small straight line segments in a segmental manner, when a small straight line segment has been processed, the total reflecting mirror rotate to an appropriate angle and moved to an appropriate position to start the processing of the next small straight line segment; ensure the incident angle of the reflected laser beam, i.e., the included angle between the reflected laser beam and the normal line of the region to be processed on the hidden surface is controlled within a range of 0°~30°.

The device can be used through the following steps:
(1) Applying an absorbing layer on the region to be processed on the hidden surface of a workpiece, and then loading the workpiece into an empty water tank;
(2) Mounting the total reflecting mirror, signal collecting card I, and signal collecting card II onto the fixture in a way that both the signal collecting card I and the signal collecting card II are in the plane of the total reflecting mirror; then, connecting the fixture, feeder unit and working platform, and fixing the entire working platform to the bottom of the workpiece;
(3) Setting the laser to output a low energy laser beam used for indicating through the laser control unit, switching on the laser, and then adjusting the position and angle of the total reflecting mirror through the control system, to make the reflected laser beam perpendicular to the topmost point A of the region to be processed on the workpiece, and ensure that both the signal collecting card I and the signal collecting card II are coplanar with the incident laser beam, the measurement directions of the signal collecting card I and signal collecting card II are parallel to the reflected laser beam, and both the distance between the signal collecting card I and the signal collecting card II and the distance between the incidence point of the incident laser beam on the total reflecting mirror and the signal collecting card II are L; in this state, the signal collecting card I and signal collecting card II correspond to point C and B on the hidden surface respectively;
(4) Utilizing the control system to obtain data H1 and H2 from the signal collecting card I and signal collecting card II and the included angle θ1 between the total reflecting mirror and the incident laser beam, and then using formulae to obtain the rotation angle $$\theta 3 = \operatorname{atan} L * \frac{\cos\theta 1 - (H2 - H1)}{L * \sin\theta 1}$$

$$\theta 3 = \operatorname{atan} \frac{L * \cos\theta 1 - (H2 - H1)}{L * \sin\theta 1}$$

of the total reflecting mirror and the corresponding down-shift length $$H = \left(\frac{L}{2 * \cos\theta 1} + h2\right) * \left(\frac{\sin(2 * \theta 1)}{\sin(2 * (\theta 1 + \theta 3))} + \cos(2 * \theta 1)\right)$$

of the total reflecting mirror required for processing the next small straight line segment;
(5) Setting the down-shift step size of the total reflecting mirror to $$\frac{D * \tan\theta 1}{4},$$

where, D is the speckle diameter, and making the lapping rate of laser shock peening to 50%; the processing of the first small straight line segment AB will be finished when the total reflecting mirror moves downwards by $$\frac{L}{2 * \cos\theta 1};$$

then, using the control system to adjust the total reflecting mirror according to the rotation angle θ3 and down-shift length H obtained in the previous step, and saving θ1+θ3 as the new value of θ1;
(6) Repeating the above two steps, and using the control system to calculate the complete shifting and rotation information of the total reflecting mirror in the entire laser shock peening process and saving the information; and then moving the total reflecting mirror to its initial position, i.e., the position of the total reflecting mirror when the topmost point A in the region to be processed on the workpiece is processed;
(7) Filling tap water into the water tank, till the liquid level in the water tank is higher than the upper surface of the workpiece by 5-10 mm;
(8) Setting the output pulse energy, speckle diameter D, and pulse width of the laser through the laser control unit, switching on the laser and starting laser shock peening on the workpiece; regulating the movement of the total reflecting mirror through the control system according to the stored complete shifting and rotation information of the total reflecting mirror and thereby completing a top-to-bottom processing procedure;

Embodiment 1

Figure 1:
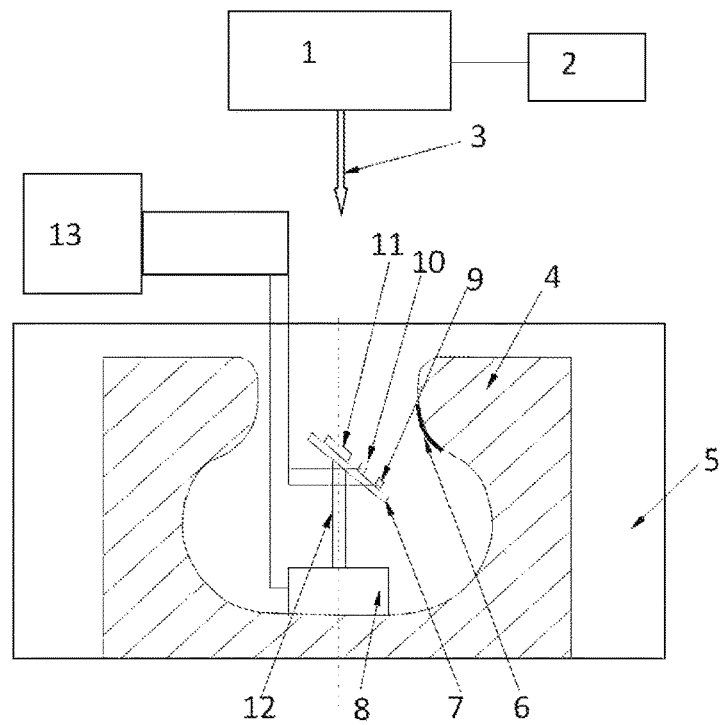
FIG. 1 is a schematic diagram of laser shock peening on a hidden surface.

A laser shock peening device for a hidden surface, as shown in FIG. 1, comprising: a laser 1, a laser control unit 2, a water tank 5, an absorbing layer 6, a fixture 7, a working platform 8, a signal collecting card I 9, a signal collecting card II 10, a total reflecting mirror 11, a feeder unit 12, and a control mechanism 13.

The laser 1 is disposed at the topmost position, and the laser control unit 2 is connected to the laser 1; the water tank 5 is disposed under the laser 1; the workpiece 4 is disposed on the bottom of the water tank 5; the total reflecting mirror 11, signal collecting card I 9, and signal collecting card II 10 are mounted on the fixture 7; the fixture 7 is connected to the working platform 8 through the feeder unit 12; the control system 13 is disposed outside of the water tank 5, and is connected with the signal collecting card I 9, signal collecting card II 10, and working platform 8 respectively through signal lines.

Embodiment 2

The laser shock peening method for a hidden surface is implemented through the following steps:

(1) Applying an absorbing layer 6 on the region to be processed on the hidden surface of a workpiece 4, and then loading the workpiece 4 into an empty water tank 5;

(2) Mounting the total reflecting mirror 11, signal collecting card I 9, and signal collecting card II 10 onto the fixture in a way that both the signal collecting card I 9 and the signal collecting card II 10 are in the plane of the total reflecting mirror 11; then, connecting the fixture 7, feeder unit 12 and working platform 8, and fixing the entire working platform to the bottom of the workpiece;

(3) Setting the laser 1 to output a low energy laser beam used for indicating through the laser control unit 2, switching on the laser 1, and then adjusting the position and angle of the total reflecting mirror 11 through the control system 13, and make the reflected laser beam perpendicular to the topmost of the region to be processed on the workpiece 4, and ensure that both the signal collecting card I 9 and the signal collecting card II 10 are coplanar with the incident laser beam 3, the measurement directions of the signal collecting card I 9 and signal collecting card II 10 are parallel to the reflected laser beam, and both the distance between the signal collecting card I 9 and the signal collecting card II 10 and the distance between the incidence point of the incident laser beam 3 on the total reflecting mirror 11 and the signal collecting card II 10 are L=10 mm;

(4) Utilizing the control system to obtain data H1 (=35.6 mm) and H2 (=38.4 mm) from the signal collecting card I 9 and signal collecting card II 10 and the included angle $\theta 1$ (=58.4°) between the total reflecting mirror 11 and the incident laser beam 3, and then using formulae $$\theta 3 = \text{atan} L * \frac{\cos\theta 1 - (H2 - H1)}{L * \sin\theta 1}$$

and $$H = \left(\frac{L}{2 * \cos\theta 1} + h2\right) * \left(\frac{\sin(2*\theta 1)}{\sin(2*(\theta 1 + \theta 3))} + \cos(2*\theta 1)\right)$$

to obtain the rotation angle $\theta 3$ (=16.0°) of the total reflecting mirror 11 and the corresponding down-shift length H (=12.14 mm) of the total reflecting mirror 11 required for processing the next small straight line segment;

(5) Setting the down-shift step size of the total reflecting mirror 11 to 1.22 mm according to formula $$\frac{D * \tan\theta 1}{4},$$

where, D is the speckle diameter, equal to 3 mm, and making the lapping rate of laser shock peening to 50%; the processing of the first small straight line segment will be finished when the total reflecting mirror 11 moves downwards by 9.54 mm according to formula $$\frac{L}{2 * \cos\theta 1};$$

then, using the control system 13 to adjust the total reflecting mirror 11 according to the rotation angle $\theta 3$ and down-shift length H obtained in the previous step, and save $\theta 1+\theta 3$ as the new value of $\theta 1$; thus, the total reflecting mirror 11 is rotated by 16.0° and moved down by 12.14 mm, and $\theta 1$ is updated to 74.4°;

(6) Repeating the above two steps, and using the control system 13 to calculate the complete shifting and rotation information of the total reflecting mirror 11 in the entire laser shock peening process and saving the information; and then moving the total reflecting mirror 11 to its initial position, i.e., the position of the total reflecting mirror 11 when the topmost point A in the region to be processed on the workpiece 4 is processed;

(7) Filling tap water into the water tank 5, till the liquid level in the water tank 5 is higher than the upper surface of the workpiece by 5-10 mm;

(8) Setting the output pulse energy, speckle diameter D, and pulse width of the laser 1 through the laser control unit 2, switching on the laser 1 and start laser shock peening for the workpiece 4; regulating the movement of the total reflecting mirror 11 The through control system 13 according to the stored complete shifting and rotation information of the total reflecting mirror 11 and thereby completing a top-to-bottom processing procedure.

We claim:

1. A device for laser shock peening for a hidden surface, comprising:
  a laser,
  a laser controller setting the laser to output a energy laser beam used for indicating through the laser controller, switching on the laser, and then adjusting a position and angle of a total reflecting mirror through the laser controller,
  a water tank,
  an absorbing layer,
  a fixture,
  a working platform,
  a first laser signal collecting card,
  a second laser signal collecting card,
  a total reflecting mirror,
  a feeder unit, and
  a control structure receiving signals from the first single collecting card and the second single collecting card and controlling the movement of the working platform, the first single collecting card, and the second single collecting card simultaneously, wherein, the laser is disposed at the topmost position, the laser controller unit is connected to the laser for controlling operation of the laser, the water tank is disposed under the laser, the total reflecting mirror, the first laser signal collecting card and the second laser signal collecting card are mounted on the fixture, the fixture is connected to the working platform through the feeder unit, the control structure to control movement of the working platform is disposed outside of the water tank, and is connected with the first laser signal collecting card, the second laser signal collecting card, and the working platform through signal cables respectively, wherein both the first laser signal collecting card and the second laser signal collecting card are in a plane of the total reflecting mirror, a connecting line between the first laser signal collecting card and the second laser signal collecting card is coplanar with an incident laser beam, and the distance between the first laser signal collecting card and the second laser signal collecting card is equal to the distance between an incidence point of the incident laser beam on the total reflecting mirror and the second laser signal collecting card, and wherein the feeder unit enables the fixture to move in six degrees of freedom.

* * * * *